Oct. 29, 1940.  F. C. DAVIS  2,219,809

APPARATUS FOR HANDLING VEGETABLES OR THE LIKE

Filed Feb. 7, 1939  2 Sheets-Sheet 1

INVENTOR
Ford C. Davis
BY
Ralph Barrow,
ATTORNEY

Oct. 29, 1940.  F. C. DAVIS  2,219,809
APPARATUS FOR HANDLING VEGETABLES OR THE LIKE
Filed Feb. 7, 1939   2 Sheets-Sheet 2
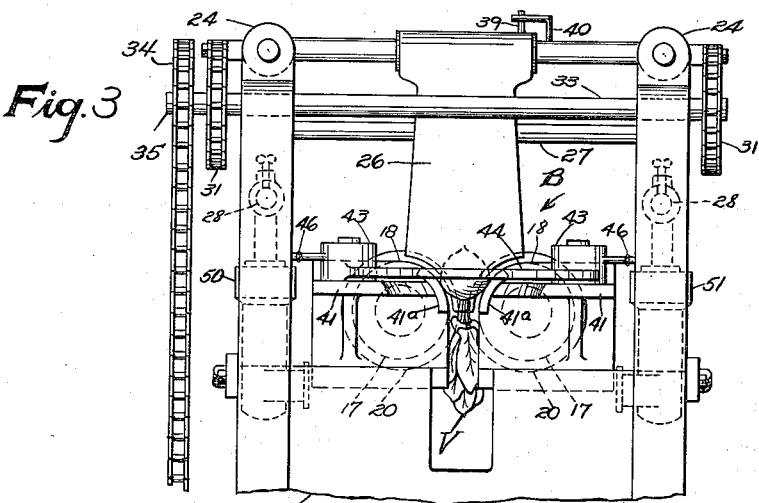
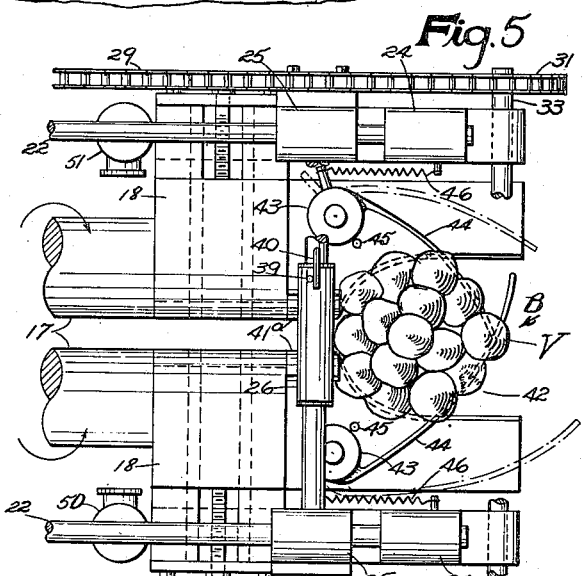
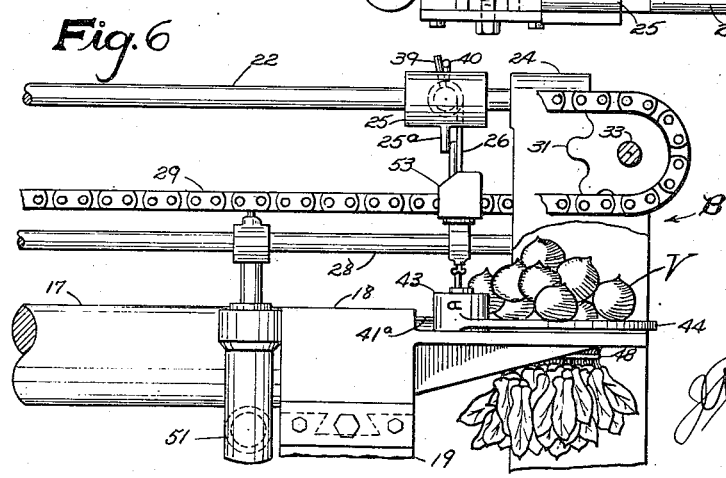
INVENTOR
FORD C. DAVIS
Ralph Barrow
ATTORNEY Patented Oct. 29, 1940

2,219,809

UNITED STATES PATENT OFFICE 2,219,809

APPARATUS FOR HANDLING VEGETABLES OR THE LIKE

Ford C. Davis, Hartville, Ohio

Application February 7, 1939, Serial No. 255,083

17 Claims. (Cl. 100—31)

This invention relates to apparatus for handling vegetables or the like, and particularly relates to conveyor mechanism in which vegetables or the like are prepared for market.

An object of the invention is to provide apparatus for washing or otherwise treating vegetables, such as radishes, turnips, beets, etc., and automatically assembling the same in bunches of substantially uniform size.

Another object of the invention is to provide apparatus of the character described in which root vegetables or the like are automatically assembled in bunches containing a substantially predetermined number of vegetables therein.

Another object of the invention is to provide apparatus of the character described in which root vegetables are arranged in groups of substantially uniform predetermined size.

Another object of the invention is to provide apparatus of the character described in which the vegetables are automatically arranged in inverted condition.

A further object of the invention is to provide apparatus of the character described in which the vegetables are automatically arranged and delivered in the same relative positions.

A further object of the invention is to provide apparatus of the character described in which undersized vegetables are segregated from the others.

These and other objects of the invention will be manifest from the following brief description and the accompanying drawings.

Application Serial No. 322,528, filed March 6, 1940, is a continuation in part of the present application.

Of the accompanying drawings:

Figure 3 is an enlarged end elevation, partly broken away, of the apparatus as viewed from right of Figure 1.

Figure 4 is a cross-section taken on line 4—4 of Figure 1.

Figure 5 is an enlarged fragmentary plan view of the bunching mechanism after a bunch has been formed.

Figure 6 is a side elevation, partly broken away, of the mechanism shown in Figure 5.

Figure 1:
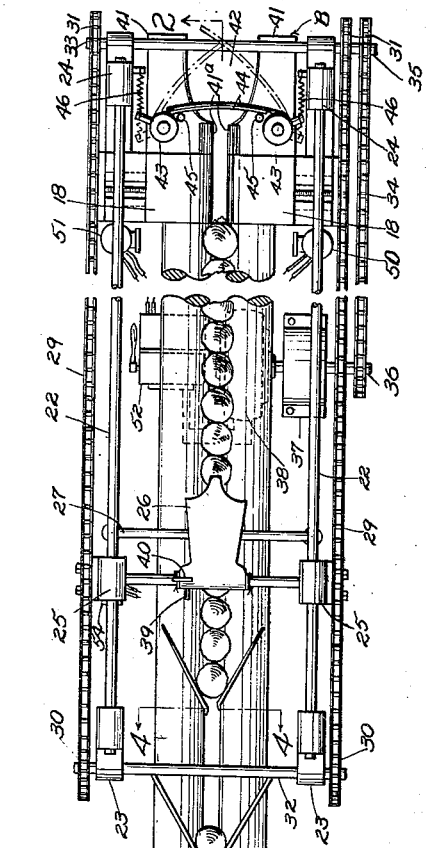
Figure 1 is a plan view, partly broken away, of the apparatus embodying the invention.

The numeral 10 designates an upwardly inclined endless conveyor having thereon cross-pieces 11, 11, on which are hooks 12 designed to engage with vegetables V, supplied at a suitable source of supply (not shown), and to deliver them to a hopper 13. Conveyor 10 may be driven by a drive chain 14, through bevel gears 15 and 16 driven by any suitable means (not shown).

The hopper 13 is arranged to receive vegetables V as they drop off the upper end of conveyor 10, and to deposit them between a pair of rolls 17, 17 adjacent the ends thereof, the rolls 17 being journalled in laterally adjustable bearings 18, 18, on a suitable frame 19. Rolls 17 are spaced apart a suitable distance to retain root vegetables of a determinate size thereon, and to permit the tops of the vegetables to be urged therebetween by rotation of the rolls inwardly toward the bight thereof at the top of the rolls. The inward rotation of the rolls causes the vegetables to be automatically inverted, or held in inverted position, with tops extending downwardly. The surfaces of the rolls 17 may be of rubber or similar material to minimize the danger of bruising the vegetables.

The rolls 17 may have projecting helical ribs or webs 20, preferably formed of rubber or similar material, extending from the hopper end along a substantial proportion of the total length of the rolls. These helical ribs may be arranged to move the vegetables longitudinally along the rolls toward a bunching device, subsequently to be described, the length of the helically ribbed portions of the rolls being sufficient to assure that all of the vegetables will be in inverted position before reaching the bunching mechanism. Suitable spray nozzles 21 may be arranged to project a spray of water over the vegetables as they move along the rolls, thereby thoroughly to wash the vegetables before they pass on to the buncher. Water from the washing operation is effective to lubricate the rolls 17 so that the vegetables more readily move thereon, and is further effective to aid in arranging the vegetables in inverted position between the rolls.

Figure 2:
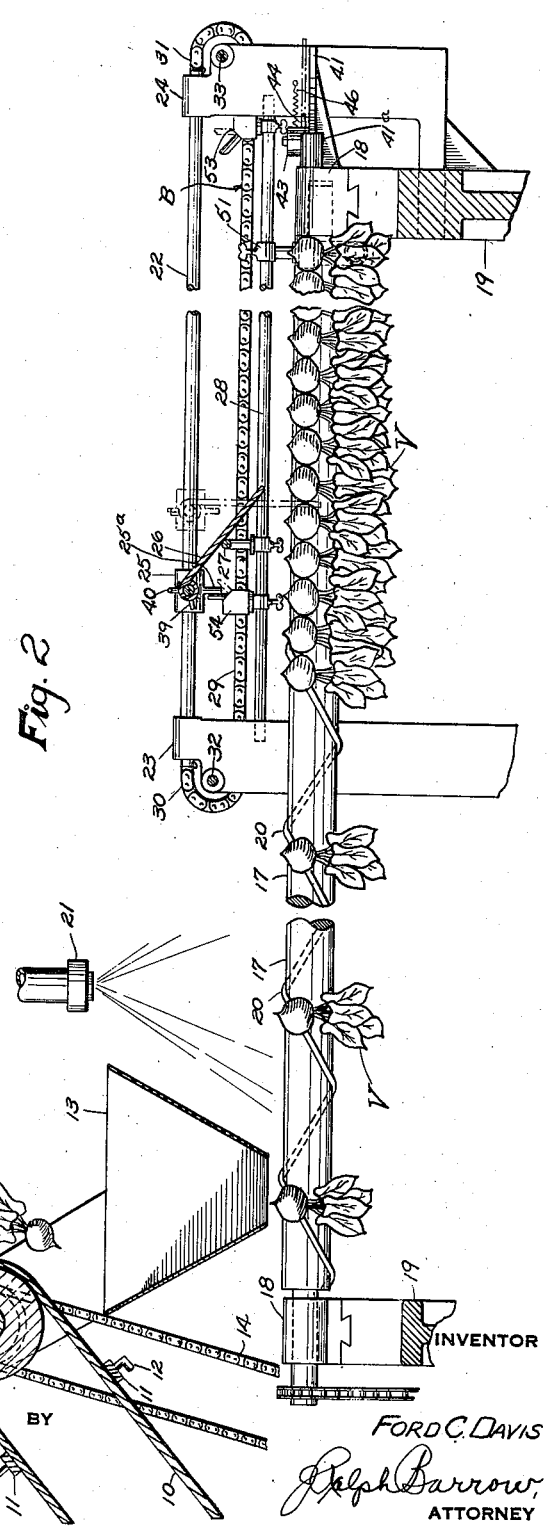
Figure 2 is a cross-section on line 2—2 of Figure 1.

A suitable proportion of the length of the rolls 17, at the end remote from hopper 13, preferably is smooth and unobstructed by helical ribs to permit the vegetables to be progressively urged along the rolls by contact of one with the other after passing out of engagement with the helical ribs 20, as best shown in Figures 1 and 2. Arranged adjacent the smooth end portions of rolls 17 may be a pair of longitudinally extending rails 22, 22 supported on upwardly extending brackets 23, 23 and 24, 24. A cross-head 25 slidably mounted between the elements 22 preferably has pivotally mounted thereon a suitably shaped plate 26, normally held upwardly out of contact with the vegetables V on rolls 17, by means of a laterally extending rod 27 adjustably secured to a pair of bars 28, the latter being fixed between the brackets 23 and 24 (see Figures 1 and 2). For slidably reciprocating cross-head 25 on rails 22 from and toward a buncher B, the cross-head may have attached to the outer ends thereof endless chains 29, 29 engaged about sprockets 30, 30 and 31, 31, keyed on transverse shafts 32 and 33, journalled in supports 23, 23 and 24, 24, respectively. Shaft 33 is driven by a drive chain 34, extended between a sprocket 35 on shaft 33 and a sprocket 36 driven, through a reduction gearing 37, by a suitable reversing type motor 38.

Plate 26, upon becoming disengaged with rod 27, drops to a vertical position between two adjacent vegetables, as shown in chain-dotted lines in Figure 2, during the initial movement of cross-head 25 toward buncher B. Rearward movement of plate 26, from this vertical position, is prevented by a pin 39 thereon engaging a stop 40 on cross-head 25, so that as the plate continues to be urged forwardly to the position thereof shown in Figures 5 and 6, it engages behind one vegetable and urges it and a substantially predetermined number of vegetables ahead of it along the smooth part of the rolls 17 toward buncher B.

For bunching the vegetables there may be mounted on the forward ends of bearings 18 a pair of spaced, horizontally disposed, plates 41, 41, the upper faces of which are in substantial alignment with average lines of contact between the roots of vegetables V and the surfaces of rolls 17. Plates 41 preferably have at the inner edges thereof vertically extending members 41ª, 41ª, the inner surfaces of which are in alignment with the top inner surfaces of bearings 18, which in turn are in alignment with the surfaces of rolls 17. The plates 41 may be shaped to provide a central opening 42 communicating with the space between the plates 41ª, this opening preferably being slightly smaller across than the average diameter of a finished bunch so that the roots will be retained on plates 41, with the tops of the vegetables extending through the opening, after the bunch is formed (see Figure 5).

Pivoted at 43, 43 on plates 41 may be a pair of oppositely disposed, preferably forwardly curved bars 44, 44 which normally extend across opening 42, urged into cooperating overlapped relation, against stop pins 45, 45 by suitably arranged springs 46, 46, substantially closing the opening as shown in full lines in Figure 1. One of the bars 44 preferably is longer than the other so that the bars will be urged into the same relative positions after each bunching operation. Movement of plate 26 from the chain-dotted position thereof shown in Figure 2 to the position shown in Figures 5 and 6, urges a substantially predetermined number or quantity of vegetables, assembled at the smooth end of rolls 17, at first successively one against the other and then into bunched relation against the bars 44, the latter being yieldably opened up a suitable amount to shape the bunch over the opening 42 as plate 26 approaches its forward stop position, best shown in Figure 5. It is to be understood that as the bunch is being formed over opening 42 the vegetables are yieldably urged one against the other between plate 26 and bars 44 in a manner that does not permit any of the vegetables to become loose and fall through the opening 42. The bars 44 may be relatively narrow so that they will be urged under the outermost roots, to retain the bunch thereon as well as on portions of plates 41 about the opening 42, the tension of springs 46 being such that after plate 26 returns to its starting position the bars 44 are retained forwardly about the tops without urging any of the roots back along the plates 41ª. After the bunch is thus formed an operator may place tying means 48, such as an elastic band, about the tops and then remove the bunch by yieldingly urging it past the ends of the bars 44 (see chain-dotted lines in Figure 5), to be packed in the usual manner for marketing.

For predetermining the size of the bunch to be formed in buncher B, an electric-eye device, comprising a light-sensitive tube 50 and a beam-directing tube 51 mounted opposite each other on the bars 28, may be utilized. Tubes 50 and 51 preferably are longitudinally adjustable for regulating the size of the bunch or quantity of vegetables formed in the bunch. The beam from tube 51 preferably crosses the path of the tops of the vegetables projecting beneath the rolls. As soon as the first forwardly moving vegetable of each series forming a bunch intercepts the beam from tube 51, a suitable switch (not shown), in a circuit box 52, is actuated to start motor 38, thereby driving chain 29 to move plate 26 toward buncher B. When plate 26 reaches the end of its forward stroke a limit switch 53, adjustably mounted on one of the bars 28, is actuated by a lug 25ª on cross-head 25 to stop motor 38. After the bunch is formed the operator may press a push button (not shown) to reverse motor 38 and thereby return plate 26 to its original position where lug 25ª trips a switch 54 to stop the motor and automatically set the electrical circuit in condition for the next bunching operation. It is to be understood that the tying means 48 may be applied to a bunch by mechanical means (not shown).

In the operation of the apparatus the vegetables are conveyed to hopper 13 by conveyor 10 from which they are deposited on the rolls 17, the latter preferably being continuously driven. The inward rotation of the rolls at the top thereof causes the tops of the vegetables to be urged downwardly through the space between the rolls, the rolls being set apart at such distance that only roots over a minimum size will be retained thereon in uniformly inverted position, while smaller vegetables will drop through. The ribs 20 on the rolls carry the vegetables forwardly, past the spray from nozzle 21 to be thoroughly washed.

Upon leaving the helically ribbed portions of the rolls 17, each vegetable is propelled along the bare portion of the rolls by vegetables immediately behind it. When the leading vegetable intercepts the light beam from tube 51, the tube 50 is actuated to start motor 38 which causes cross-head 25 to be moved forwardly along the rails 22. This disengages plate 26 from rod 27, which normally holds plate 26, in the inoperative position thereof, out of contact with the vegetables on the rolls, and plate 26 is permitted to drop between two adjacent roots and propel the forward one and all those ahead of it toward buncher B. Continued movement of plate 26 toward the forward stop position thereof causes the propelled vegetables to be urged yieldably against the bars 44, and the vegetables are thereby arranged in a bunch over opening 42 between the plates 41. Since a yielding pressure is maintained between adjacent vegetables while the bunch is being formed, none of the vegetables will drop through opening 42. While the tie 48 is being placed on the bunch, by hand or mechanical means (not shown), circuit switch 53 or a push button (not shown) in the meantime may be actuated to reverse motor 38 and return plate 26 to the starting position thereof, whereupon switch 54 is actuated to stop motor 38 and set the light sensitive tubes 50, 51 and the electrical circuit in condition for another bunching operation.

It will be apparent from the foregoing brief description that the invention provides simple, economical apparatus for washing or otherwise treating vegetables and arranging the same in uniform bunches with all of the vegetables in the same relative position.

Modifications of the invention may be resorted to without departing from the spirit thereof or the scope of the appended claims. It is to be understood that the vegetable conveying and inverting apparatus is capable of general application and is not necessarily limited to use in a combination with a spraying device, or with a bunching mechanism.

What is claimed is:

1. Apparatus of the character described comprising a pair of spaced elements adapted to retain vegetable roots of minimum size in the upper bight between the elements, means for supplying root vegetables into said bight, means for urging a quantity of said vegetables along said elements toward one end thereof, and means for engaging said vegetables as they are urged toward said end to form the same into a bunch.

2. Apparatus of the character described comprising a pair of spaced elements adapted to retain vegetable roots of minimum size in the upper bight between the elements, means for supplying root vegetables into said bight, means for urging a substantially predetermined quantity of said vegetables along said elements toward one end thereof, and means for engaging said vegetables as they are urged toward said end to form the same into a bunch.

3. Apparatus of the character described comprising a pair of spaced elements adapted to retain vegetable roots of minimum size in the upper bight between the elements, means for supplying root vegetables into said bight, means for urging a substantially predetermined quantity of said vegetables along said elements toward one end thereof, and means for yieldably engaging said vegetables as they are urged toward said end to form the same into a bunch.

4. Apparatus of the character described comprising a pair of spaced elements adapted to retain root vegetables in the upper bight between the elements with the tops of said vegetables extending downwardly between said elements, a yieldable member arranged adjacent the forward end of said elements, and a relatively shiftable member adapted to be shifted toward said forward end to urge a quantity of said vegetables into yielding engagement with said yieldable member, thereby to form said quantity of vegetables into a bunch.

5. Apparatus of the character described comprising a pair of spaced elements adapted to retain root vegetables in the upper bight between the elements, means for supplying root vegetables into said upper bight, means for urging the tops of said vegetables downwardly into the space between said elements, a yieldable member arranged adjacent the forward end of said elements, and a relatively shiftable member for urging a quantity of said vegetables along said elements into yielding engagement with said yieldable member, thereby to form said quantity of vegetables into a bunch.

6. Apparatus of the character described comprising a pair of spaced elements having smooth surfaces throughout their lengths, means for moving the surfaces of said elements inwardly and downwardly in the bight between them, the adjacent surfaces of said elements being substantially equally spaced at both ends thereof, means for supplying root vegetables into said bight at one end of said elements, means for feeding the vegetables from said end of the elements toward the other end thereof, said elements causing said vegetables to assume inverted positions by engaging and moving the tops thereof down between the elements without substantially crushing or tearing the tops, said elements being spaced to retain roots of desired minimum size thereon, a pair of members pivotally mounted adjacent said other end of said elements to extend in overlapping relation with each other across the path of said vegetables, means for yieldably retaining said members in overlapping relation, and means for urging a quantity of said inverted vegetables into yielding engagement with said yieldable elements to form said vegetables into a bunch.

7. Apparatus of the class described, comprising a pair of spaced rolls having smooth surfaces throughout their lengths, means for rotating the same inwardly of the upper bight thereof, the surfaces of said rolls being substantially equally spaced at both ends thereof, means for supplying a quantity of root vegetables into said upper bight at one end of the rolls, means for feeding the vegetables from said end of the rolls toward the other end thereof, said rolls causing said vegetables to assume inverted positions by engaging and moving the tops thereof down between the rolls without substantially crushing or tearing the tops, said rolls being spaced so as to retain roots of a desired size thereon, and a pair of members pivotally mounted adjacent said other end of said elements to extend in overlapping relation with each other across the path of said vegetables, means for yieldably retaining said members in overlapping relation, means for urging a quantity of said inverted vegetables into yielding engagement with said yieldable elements to form said vegetables into a bunch.

8. Apparatus of the character described, comprising a pair of spaced elements, means for moving the surface of at least one of said elements inwardly and downwardly toward the bight between the elements, the surfaces of said elements adjacent said bight being substantially equally spaced at both ends thereof, means for supplying a quantity of root vegetables into said bight at one end of said elements, means for feeding the vegetables from said end of the elements toward the other end thereof, said elements having smooth surfaces throughout their lengths causing said vegetables to assume inverted positions by engaging and moving the tops thereof down between the elements without substantially crushing or tearing the tops, said elements being spaced to retain roots of desired size thereon, and a pair of members pivotally mounted adjament said other end of said elements to extend in overlapping relation with each other across the path of said vegetables, means for yieldably retaining said members in overlapping relation, means for urging a quantity of said inverted vegetables into yielding engagement with said yieldable elements to form said vegetables into a bunch.

9. Apparatus of the character described comprising means for retaining a quantity of vegetable roots in position with the tops all extending in the same direction, a pair of members pivotally mounted adjacent one end of said retaining means to extend in overlapping relation across the path of said vegetables, means for yieldably retaining said members in overlapping relation, and means for yieldably urging said vegetables one against the other and into yielding engagement with said yieldable members, thereby to form said vegetables into a bunch.

10. Apparatus of the character described comprising means for retaining a quantity of vegetable roots in uniformly inverted positions, means for urging said vegetables forwardly along said retaining means, a pair of forwardly curved members adjacent the forward end of said retaining means, and means for yieldably retaining said curved members in overlapping relation across the path of said vegetables, said urging means being adapted to urge said vegetables one against the other and into yielding engagement with said curved members to form the vegetables into a bunch.

11. Apparatus of the character described comprising a pair of spaced elements for retaining a quantity of root vegetables in inverted positions therebetween, means for urging said roots forwardly between said spaced elements, the space between said elements being enlarged at the forward end of said elements to permit bunching of said vegetables therein, a pair of oppositely disposed members pivotally mounted at the forward end of said elements, and means for normally yieldably retaining said pivoted members in overlapping relation across the path of said roots and substantially closing the entrance to said enlarged space, said urging means being adapted to urge said roots one against the other and into yielding engagement with said yieldable members, thereby progressively to form said roots into a bunch within said enlarged space.

12. Apparatus of the character described comprising a pair of spaced elements adapted to retain root vegetables in the upper bight between said elements, means for supplying root vegetables into said upper bright at one end of said elements, means at said supplying end of said elements for causing the tops of said vegetables to be moved downwardly into the space between the elements, means for arranging said inverted roots in a row at the other end of said elements with successive roots substantially closely adjacent to each other, a pair of oppositely disposed members shiftably mounted adjacent said other end of said elements, means for yieldably urging said members into overlapping relation across the path of said vegetables, and means for urging a substantially predetermined quantity of roots from said row along said elements into yielding engagement with said members thereby to form a bunch of roots of substantially predetermined size.

13. Apparatus of the character described comprising a pair of spaced elements adapted to retain root vegetables in the upper bight between said elements, means for supplying root vegetables into said upper bight at one end of said elements, means at said supplying end of said elements for causing the tops of said vegetables to be moved downwardly into the space between the elements, means for arranging said inverted roots in a row at the other end of said elements with successive roots substantially closely adjacent to each other, a pair of oppositely disposed members shiftably mounted adjacent said other end of said elements, means for yieldably urging said members into overlapping relation across the path of said vegetables, shiftable means for urging a quantity of roots in said row forwardly along said elements, and means for initiating the forward movement of said urging means, said initiating means being actuated by movement of a substantially predetermined quantity of roots into said row, said shiftable means being shiftable to urge said predetermined quantity of roots into yielding engagement with said yieldable members, thereby to form a bunch of roots of substantially predetermined size.

14. Apparatus of the character described comprising a pair of spaced rolls, means for rotating the same inwardly of the upper bight thereof, the surfaces of said rolls being substantially equally spaced at both ends thereof, means for supplying root vegetables into said upper bight at one end of said rolls, means for feeding the vegetables from said end and assembling the same in substantially close succession adjacent the other end of said elements, the rotation of said rolls causing said vegetables to assume inverted positions by engaging and moving the tops thereof down between the rolls, without substantially crushing or tearing the tops, said rolls being spaced so as to retain roots of desired size thereon, a pair of oppositely disposed members shiftably mounted adjacent said other end of said elements, means for yieldably urging said members into overlapping relation across the path of said vegetables, shiftable means for urging a quantity of roots in said row forwardly along said rolls, and means for initiating said forward movement of the urging means, said initiating means being actuated by advancement of a substantially predetermined quantity of said vegetables along said elements to form said row, said shiftable means being shiftable to urge said predetermined quantity of roots into yielding engagement with said yieldable members, thereby to form said roots into bunches of substantially predetermined size with the tops of the vegetables extending all in the same direction.

15. Apparatus of the character described comprising a pair of spaced elements adapted to retain root vegetables in a row with the tops thereof extending downwardly between the elements, supporting means at one end of said elements providing an enlarged opening within which a quantity of said vegetables may be formed into a bunch, a pair of cooperating arms pivotally mounted on said last named means, means for yieldably retaining said arms in cooperating relation across the path of said vegetables and normally closing the entrance to said opening, and means for urging a quantity of roots along said elements into yielding engagement with said arms, said roots thereby being yieldably engaged between said urging means and said arms and formed into a bunch within said opening.

16. Apparatus of the character described comprising a pair of spaced rolls adapted to retain root vegetables in the upper bight between the rolls, means for supplying root vegetables into said upper bight with the tops thereof extending downwardly between the rolls, means for rotating said rolls inwardly of said upper bight to retain said roots in inverted position, supporting means at one end of said rolls providing an enlarged opening within which a quantity of vegetables may be formed into a bunch, a pair of cooperating arms pivotally mounted on said supporting means, means for yieldably retaining said arms in cooperating relation across the path of said vegetables at the delivery end of said rolls and normally closing the entrance to said opening, and means for urging a quantity of roots along said rolls into yielding engagement with said arms, said roots thereby being yieldably engaged between said urging means and said arms and formed into a bunch within said opening.

17. Apparatus of the character described comprising a pair of spaced rolls adapted to retain root vegetables in the upper bight between the rolls, means for supplying root vegetables into said upper bight with the tops thereof extending downwardly between the rolls, means for rotating said rolls inwardly of said upper bight to retain said roots in inverted position, supporting means at one end of said rolls providing an enlarged opening within which a quantity of vegetables may be formed into a bunch, a pair of cooperating arms pivotally mounted on said supporting means, means for yieldably retaining said arms in cooperating relation across the path of said vegetables at the delivery end of said rolls and normally closing the entrance to said opening, and means for urging a quantity of roots along said rolls into yielding engagement with said arms, said roots thereby being yieldably engaged between said urging means and said arms and formed into a bunch within said opening, said enlarged opening being so proportioned to the size of the bunched roots as to retain the same on said supporting means with the tops thereof extending downwardly through the opening.

FORD C. DAVIS.